US005148021A

United States Patent [19]

Okamoto et al.

[11] Patent Number: 5,148,021

[45] Date of Patent: Sep. 15, 1992

[54] MASS SPECTROMETER USING PLASMA ION SOURCE

[75] Inventors: Yukio Okamoto, Sagamihara; Satoshi Shimura, Kokubunji; Konosuke Oishi, Mito; Masataka Koga, Katsuta; Makoto Yasuda, Kodaira; Takahashi Iino, Katsuta, all of Japan

[73] Assignee: Hitachi, Ltd., Tokyo, Japan

[21] Appl. No.: 630,554

[22] Filed: Dec. 20, 1990

[30] Foreign Application Priority Data

Dec. 25, 1989 [JP] Japan .................................. 1-332720

[51] Int. Cl.[5] .......................... B01D 59/44; H01J 49/00

[52] U.S. Cl. ...................................... 250/288; 250/281

[58] Field of Search ............................... 250/281, 288; 315/111.81

[56] References Cited

U.S. PATENT DOCUMENTS 4,287,419 9/1981 Booth .......................... 250/396 ML
4,740,696 4/1988 Osawa et al. ...................... 250/288
4,955,717 9/1990 Henderson ......................... 250/288
4,963,735 10/1990 Okamoto et al. ................... 250/281
5,049,739 7/1991 Okamoto ........................... 250/281

OTHER PUBLICATIONS

Satzger et al, "Spectrochimica Acta," vol. 42B No. 5 (1987) pp. 705-712.

*Primary Examiner*—Bruce C. Anderson
*Attorney, Agent, or Firm*—Fay, Sharpe, Beall, Fagan, Minnich & McKee

[57] ABSTRACT

A mass spectrometer using a plasma ion source for analyzing an ultra-trace element includes a plasma generation system for generating a plasma including the composition of a sample, an ion beam formation system for extracting ions in the form of a beam from the plasma generating the ions, a mass spectrometry system for performing mass spectrometry of the ion beamn, and an ion detection system for detecting the ions subjected to the mass spectrometry, in which a lens system made up of a cylindrical first electrode, a cylindrical second electrode with a photon stopper disposed on the central axis thereof, and a cylindrical third electrode is further provided between the ion beam formation system and the mass spectrometry system. By the provision of the lens system, the ions generated in the plasma are transported more efficiently to the side of the mass spectrometry system and by the provision of the photon stopper in the above described position, it is achieved, with a simpler structure, to prevent photons from entering the ion detection system.

14 Claims, 2 Drawing Sheets

MASS SPECTROMETER USING PLASMA ION SOURCE

BACKGROUND OF THE INVENTION

The present invention relates to an improvement in a mass spectrometer using a plasma ion source and, more particularly, relates to a mass spectrometer using a plasma ion source improved so as to be suitable for detecting an ultra-trace element present in a sample to be analyzed.

Lately a mass spetrometer using a plasma ion source for analyzing an ultra-trace element present in a sample has been under extensive development. A representative example of conventional mass spectrometers using a plasma ion source is disclosed in a publication, Spectrochimica Acta, Vol. 42B, No. 5 (1987), pp. 705–712.

FIG. 4 schematically shows the structure of the apparatus described in the above mentioned publication. Referring to the figure, reference numeral 10 denotes plasma of a gas having the composition of a sample, 20 denotes a sampler, 70 denotes a first aperture plate, 80 denotes a mass filter (mass spectrometer), 90 denotes a second aperture plate, 100 denotes an ion detector, 120 denotes a skimmer, 130 denotes an ion extraction electrode, 140 denotes an Einzel lens, 150 denotes an energy analyzer, and 151 denotes a center plate disposed on the central axis of the energy analyzer.

In the apparatus of the described arrangement, ions generated in the plasma 10 are extracted therefrom by an ion extraction system composed of the sampler 20, the skimmer 120, and the ion extraction electrode 130 and then passed through the Einzel lens 140 and the energy analyzer 150 to be admitted into the mass filter 80, where they are subjected to mass spectrometry.

The center plate 151 disposed within the energy analyzer 150 has also a function to stop photons generated in the plasma 10 from entering the ion detector 100 and brings about such an effect as to improve the S/N ratio of the output signal of the ion detector and, hence, to lower the detection limit of the detector.

In the above described conventional apparatus, however, three steps of vacuum chambers have had to be provided in the course from the plasma 10 to the mass filter 80 and the Einzel lens 140 and the energy analyzer 150 have had to be disposed midway through the course. Thus, the construction becomes complex and the number of required parts becomes great therefore, such difficulties arise that the manufacturing cost becomes high and the operation and maintenance service become difficult. Further, because of the structural complexity of the apparatus, the transport efficiency of ions from the plasma 10 to the mass filter 80 is held low and, since the above described function to prevent the photons from entering the ion detector 100 is not performed satisfactorily as yet, the S/N ratio of the detected signal is still low, and therefore, the detection limit cannot be made as sufficiently low as desired for analyzing the composition of a trace in the sample.

SUMMARY OF THE INVENTION

The present invention was made to overcome the above mentioned difficulties in the conventional apparatus.

Accordingly, an object of the present invention is to provide a mass spectrometer using a plasma ion source formed in a simple structure and of a small number of parts.

Another object of the present invention is to provide a mass spectrometer using a plasma ion source having a sufficiently low detection limit thereby making it possible to analyze the composition of a trace in a sample.

A further object of the present invention is to provide a mass spectrometer using a plasma ion source with good operability and easy maintainability.

In order to achieve the above enumerated objects, the present invention is arranged, as shown in FIG. 1, such that ions to be analyzed are efficiently extracted from plasma 10 by means of an ion extraction system made up of a sampler 20, an ion extraction electrode 30, and an ion acceleration electrode 40, and the extracted ions are efficiently admitted into a mass filter 80 by means of a lens system made up of three cylindrical electrodes 51, 52, and 53. Further, a photon stopper 60 of a small disk form is disposed on the central axis of the second electrode (intermediate electrode) 52 of the lens system 50.

The first electrode 51 of the lens system 50 may be provided independently of the ion acceleration electrode 40 as shown in FIG. 2, but, more preferably, it should be formed to be integral with the cylindrical part 42 of the ion acceleration electrode 40 as shown in FIG. 1.

By adopting the above described arrangement in the present invention, it becomes possible to transport the ions to be analyzed from the plasma 10 where they are generated to a mass filter 80 (mass spectrometry system) with high efficiency, while photons from the plasma 10 are effectively prevented from entering an ion detector 100. Thereby, the S/N ratio of the detected signal can be improved and the mass spectrometry of an ultra-trace element included in the sample can be performed at high sensitivity and with a low detection limit.

Further, as compared with the conventional apparatus, the number of the electrodes constituting the ion optical system can be greatly reduced and, hence, the number of the power supplies for applying voltages to these electrodes can be reduced, and therefore operation and maintenance service of the apparatus can be simplified and the manufacturing cost thereof can be reduced.

DESCRIPTION OF PREFERRED EMBODIMENTS

An embodiment of the present invention will be described below in detail with reference to the accompanying drawings.

Figure 1:
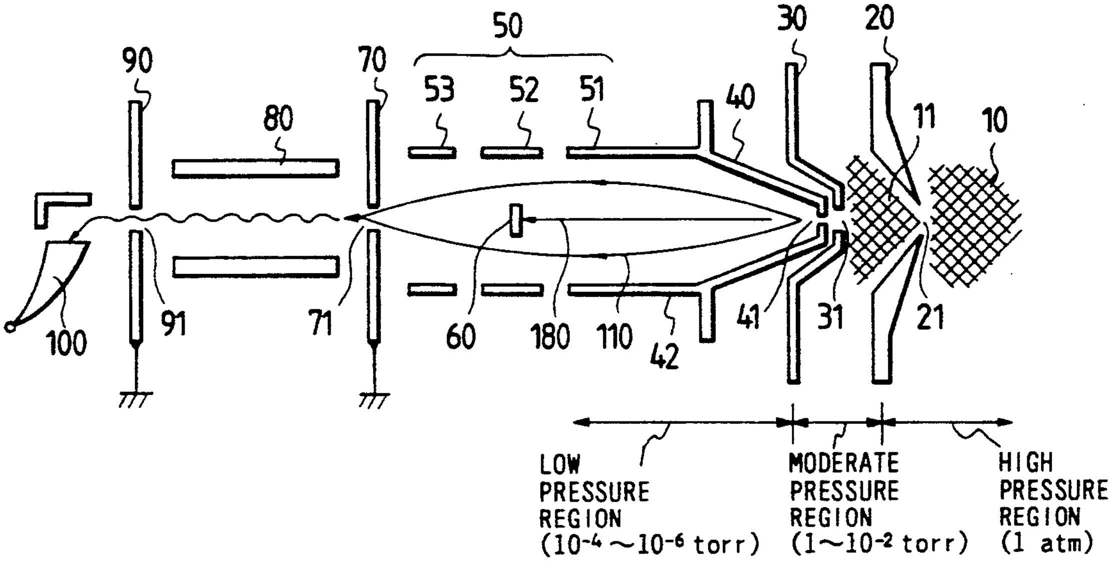
FIG. 1 is a schematic sectional view showing a general arrangement of a principal portion of a mass spectrometer using a plasma ion source according to an embodiment of the present invention.

A general arrangement of a principal portion of a mass spectrometer using a plasma ion source according to an embodiment of the present invention is shown in FIG. 1. Referring to the figure, reference numeral 10 denotes plasma generated in an atmospheric-pressure region utilizing a radio frequency discharge or microwave discharge, the sample to be analyzed being introduced thereto to be ionized.

Reference numeral 20 denotes a sampler formed of a metallic material such as nickel and copper, with an orifice (0.3 to 1.0 mm in diameter) 21 made in the center thereof. Through the orifice 21, a portion in the center of the plasma 10 diffuses into a moderate pressure region (0.01 to 1.0 Torr), whereby diffused plasma 11 is formed.

Reference numeral 30 denotes an ion extraction electrode formed of a metallic material such as nickel, copper, and stainless steel, with an orifice (0.5 to 1.0 mm in diameter) 31 made in the center thereof. Through the orifice 31, ions in the diffused plasma 11 are taken into a high vacuum region.

Reference numeral 40 denotes an ion acceleration electrode formed of a metallic material such as copper and stainless steel, with an orifice (0.4 to 1.0 mm in diameter) 41 made in the center thereof. Through the orifice 41, an accelerated ion beam is drawn.

By having an ion beam formation system constructed of the sampler 20, the ion extraction electrode 30, and the ion acceleration electrode 40 as described above, the ions to be subjected to analysis generated in the plasma 10 can be extracted therefrom with high efficiency.

Reference numeral 50 denotes a lens system for efficiently guiding the ion beam, drawn through the orifices 31 and 41, to the side of the mass spectrometry system. The lens system is constructed of a first electrode 51, a second electrode 52, and a third electrode 53. In the present embodiment, the first electrode 51 is formed integral with a cylindrical part 42 provided at the rear of the ion acceleration electrode 40.

Reference numeral 60 denotes a disk-form photon stopper (1 to 10 mm in diameter) made of a metallic material such as stainless steel and disposed on the central axis of the second electrode 52 for cutting off photons generated in the plasma 10 and incoming straight through the orifices 21, 31, and 41.

Reference numeral 70 denotes a first aperture plate, with an aperture 71, formed of stainless steel or the like. Reference numeral 80 denotes a mass filter (mass spectrometer) using, for example, a quadruple mass filter. Reference numeral 90 denotes a second aperture plate, with an aperture 91, formed of stainless steel or the like. Reference numeral 100 denotes an ion detector using, for example, a channeltron.

Figure 2:
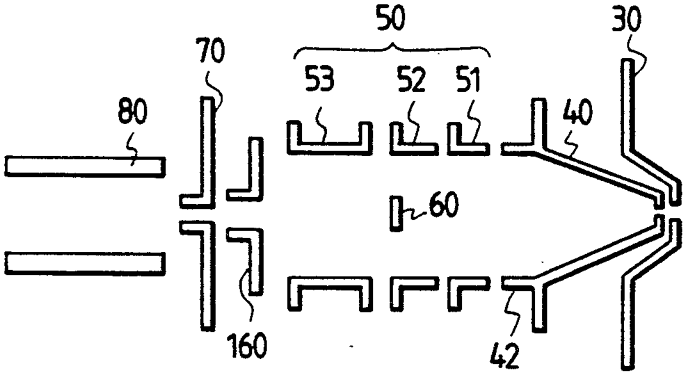
FIG. 2 is a schematic sectional view showing a general arrangement of a principal portion of a mass spectrometer according to another embodiment of the present invention.

The first electrode 51 of the lens system 50 can also be provided independently, i.e., separate from the cylindrical part 42 of the ion acceleration electrode 40, as shown in FIG. 2.

Further, as shown in FIG. 2, an aperture electrode 160 may be provided between the third electrode 53 and the first aperture plate 70. By applying potential $E_5$ (for example, +20 V) to the aperture electrode 160 as shown in FIG. 3, it becomes possible to have the ion beam passing through the lens system 50 admitted into the mass filter 80 more efficiently.

Figure 3:
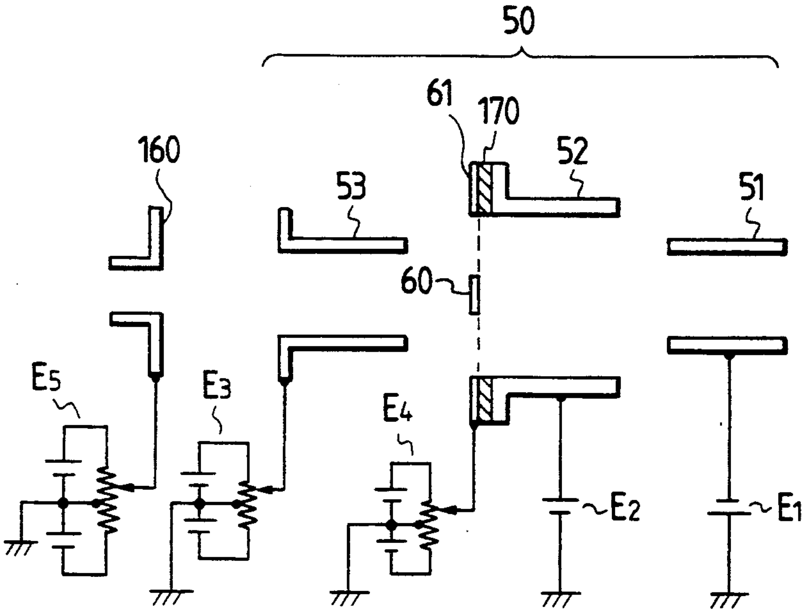
FIG. 3 is a schematic sectional view showing a manner of application of potential in a mass spectrometer according to a further embodiment of the present invention.
Figure 4:
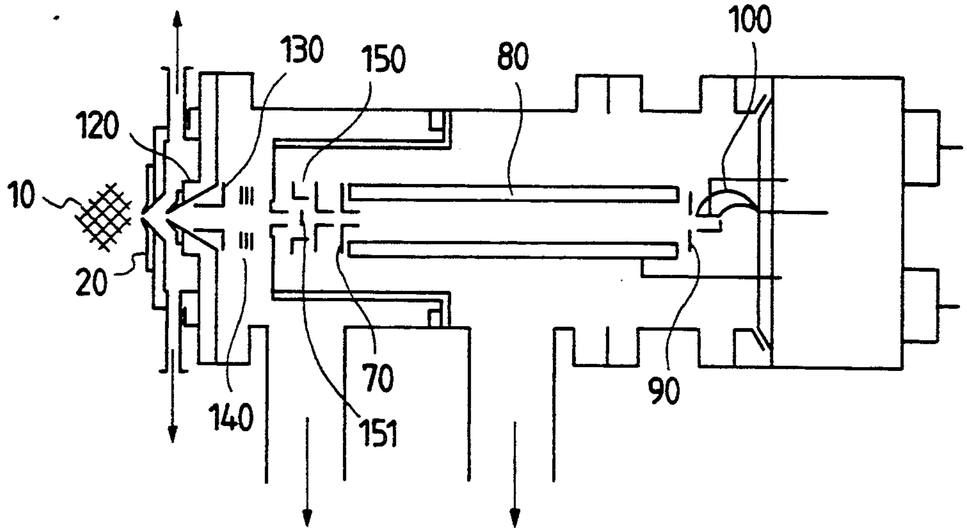
FIG. 4 (PRIOR ART)
FIG. 4 is a schematic sectional view showing a general arrangement of a principal portion of a conventional apparatus.

In the above described arrangement of the apparatus, each electrode is applied with a potential as shown in FIG. 3. More specifically, the ion acceleration electrode 40 and the first electrode 51 are applied with $E_1$ (normally, −100 to −500 V), the second electrode 52 is applied with $E_2$ (normally, +5 to +20 V), the third electrode 53 is applied with $E_3$ (normally −10 to +50 V), and the aperture electrode 160 is applied with $E_5$ (normally +30 to −300 V). The sampler electrode 20 and the ion extraction electrode 30 are normally set to the ground potential but, they can sometimes be used with positive potential applied thereto. The distance between the sampler electrode 20 and the ion extraction electrode 30 is normally 2 to 10 mm.

The photon stopper 60 is applied with the same potential as the second electrode 52 (i.e., $E_2$) or it is separately applied with $E_4$ (normally, −5 to +20 V). In the former case, the photon stopper 60 is electrically connected to the second electrode 52 through a holding plate 61. In the latter case, the holding plate 61 is attached to the second electrode 52 through an insulator 170.

The three electrodes constructing the lens system 50 are formed of stainless steel, aluminum, or the like. The inner diameter of the cylinder is 15 to 40 mm and the length is 5 to 30 mm and the cylinder may be provided with flange portions as shown in FIG. 3. It is preferred that the inner diameter of the second electrode 52 is made larger than the first and third electrodes 51 and 53. The photon stopper 60 can be fabricated by such a method as to subject a thin stainless steel plate (0.1 to 1 mm thick) to an etching process. The spacings between these lens electrodes are 5 to 30 mm.

With the apparatus arranged as described above, a portion of plasma 10 generated in the atmospheric-pressure region is drawn into the moderate pressure region through the orifice 21 of the sampler 20 whereby diffused plasma 11 is formed. At this time, an ion sheath is formed along the surface of the ion extraction electrode 30 confronting the plasma and the ions to be analyzed are efficiently drawn out of this ion sheath through the orifice 31. The drawn ions are accelerated by the ion acceleration electrode 40 (accelerated ion energy: $E_1$eV) and admitted into the lens system 50 through the orifice 41.

The ions admitted into the lens system 50 are first decelerated (diverged) within the lens system 50 and then accelerated (converged) toward the first aperture plate (ground potential) 70, and as a result, curved trajectories as shown in FIG. 1 are formed. More specifically, within the lens system 50, since the second electrode 52 is held at a positive potential, while the first electrode 51 is held at a negative potential, the admitted ions (positive ions) are decelerated and diverged due to the lens field formed between the first and second electrodes 51 and 52. The thus diverged ion beam 110 travels through the second electrode 52 as diverged and then it is accelerated and converged by the lens field formed between the second and third electrodes 52 and 53 and the field formed between the third electrode 53 and the first aperture plate 70.

The ions travel as diverged through the second electrode 52 as described above. Hence, most of the ions advance around the photon stopper 60, making a detour, and, thus, they are efficiently transported into the mass filter 80. On the other hand, the photons 180 generated in the plasma 10 and admitted into the lens system 50 through the orifices 21, 31, and 41 continue a straight advance and bombard the photon stopper 60 to be cut off thereby. Thus, most of the photons are cut off by the photon stopper 60 while only a portion of the ions are cut off thereby and, hence, the ratio of the quantity of photons to the quantity of the ions entering the ion detector 100 is greatly reduced and the S/N ratio of the detected signal is greatly improved (by one order or more).

Needless to say, the method for generating plasma 10 is not limited to that described in the above embodiment.

According to the present invention, as apparent from the foregoing detailed description, (1) the ions to be subjected to analysis generated in the plasma can be extracted from the plasma efficiently and transported into the mass filter efficiently and (2) the quantity of the photons entering the ion detector can be greatly reduced. Thus, the S/N ratio of the detected signal can be greatly improved and, hence, such an effect is obtained that enhancement in the analyzing sensitivity and reduction in the detection limit can be achieved.

Further, since the number of electrodes in the course from the sampler to the mass filter and the number of power supplies for driving these electrodes are greatly reduced, not only the manufacturing cost of the apparatus is reduced but also the operation of the apparatus and adjustments in maintenance service of the apparatus can be simplified.

What is claimed is:

1. A mass spectrometer using a plasma ion source comprising:

- a plasma generation system for generating a plasma including the composition of a sample;
- an ion beam formation system for forming a beam of ions generated in said plasma, said ion beam formation system including an ion extraction electrode for extracting ions from said plasma and an ion acceleration electrode for accelerating the extracted ions;
- a mass spectrometry system for performing mass spectrometry of the ion beam;
- an ion detection system for detecting the ions subjected to the mass spectrometry;
- a lens system including first, second and third cylindrical electrodes, provided between said ion beam formation system and said mass spectrometry system for first diverging and then converging the ion beam from said ion beam formation system; and
- a photon stopper, comprising a disk-shaped metal plate, provided on the central axis of the ion beam in the region where the ion beam is diverged by said lens system, for cutting off the photons traveling from said plasma straight along the central axis of the ion beam.

2. A mass spectrometer using a plasma ion source according to claim 1, wherein said ion beam formation system includes a sampler for acquiring a portion of the plasma as diffused plasma, and said ion extraction electrode extracts ions from the diffused plasma.

3. A mass spectrometer using a plasma ion source according to claim 2, wherein said first electrode is formed integral with said ion acceleration electrode.

4. A mass spectrometer using a plasma ion source according to claim 1, further comprising a fourth cylindrical electrode provided between said third electrode and said mass spectrometry system, said fourth cylindrical electrode being applied with a DC voltage.

5. A mass spectrometer using a plasma ion source according to claim 4, wherein said first electrode is formed integral with said ion acceleration electrode.

6. A mass spectrometer using a plasma ion source according to claim 5, wherein said photon stopper is electrically connected to said second electrode.

7. A mass spectrometer using a plasma ion source according to claim 4, wherein said photon stopper is electrically connected to said second electrode.

8. A mass spectrometer using a plasma ion source according to claim 1, wherein said first electrode is formed integral with said ion acceleration electrode.

9. A mass spectrometer using a plasma ion source according to claim 8, wherein said photon stopper is electrically connected to said second electrode.

10. A mass spectrometer using a plasma ion source according to claim 1, wherein said photon stopper is electrically connected to said second electrode.

11. A mass spectrometer using a plasma ion source comprising:

- plasma generation means for generating plasma including the composition of a sample;
- ion extraction means for extracting ions from the plasma;
- ion acceleration means for accelerating the extracted ions;
- lens means for first diverging and then converging the accelerated ions;
- mass spectrometry means for applying mass spectrometry to the converged ions; and
- ion detection means for detecting the ions subjected to the mass spectrom try;
- wherein said lens means made up of a cylindrical first electrode, a cylindr al second electrode with a photon stopper disposed on the central axis thereof, and a cylindrical third electrode, and said diverging and converging causes said ions to travel around said stopper and exit from an end of said third electrode.

12. A mass spectrometer using a plasma ion source according to claim 11, wherein said ion acceleration means includes an ion acceleration electrode, and said first electrode is formed integral with said ion acceleration electrode.

13. A mass spectrometer using a plasma ion source according to claim 12, wherein said photon stopper is electrically connected to said second electrode.

14. A mass spectrometer using a plasma ion source according to claim 11, wherein said photon stopper is electrically connected to said second electrode.

* * * * *